United States Patent Office
2,843,557
Patented July 15, 1958

2,843,557

COMPOSITION CONTAINING EPOXY RESIN, POLYVINYL CHLORIDE, AND PLASTICIZER

Moyer M. Safford, Schenectady, N. Y., assignor to General Electric Company, a corporation of New York No Drawing. Application March 8, 1955
Serial No. 493,057

4 Claims. (Cl. 260—30.6)

This invention relates to a process of producing polyvinyl halides and copolymers thereof having decreased thermoplasticity at elevated temperatures. More particularly, this invention relates to a composition of matter comprising an admixture of a plasticizer, an epoxide polymer, a polyamide, and a member of the group consisting of a polyvinyl halide and a copolymer thereof (hereafter collectively referred to as polyvinyl compounds), and to the products produced by curing this admixture.

One of the more important uses for polyvinyl compounds is as an electrical insulating material. In addition to possessing excellent electrical properties, polyvinyl compounds are substantially insensitive to moisture, are non-flammable and give good aging performance when adequately stabilized. One of the explanations given for the lower power and loss factors of polyvinyl compounds, which contain such highly polar groups as halogen, is that the halogen groups within the polymer are relatively rigid and immobile so that they cannot absorb energy from electrical fields by rotation, stretching, bending or other movements. The term "loss factor" is defined as dielectric constant times power factor. But the dielectric constant, loss and power factors of polyvinyl compounds are markedly influenced by temperature. In accord with the fact that these electrical properties depend on the mobility of the polar groups in polyvinyl compounds, the viscosity, plasticity and hardness of the polymer appear to affect these electrical properties.

Industry has restricted polyvinyl compounds to low temperature electrical insulation because as the temperature is raised, polyvinyl compounds begin to flow, resulting in electrical losses until at a sufficiently high temperature, they flow away from the conductor making short circuits possible. Thus, polyvinyl compounds possessing decreased thermoplastic flow would extend the horizon of their use in high temperature electrical applications.

I have discovered that the thermoplasticity of polyvinyl compounds can be reduced by incorporating polyamides and epoxides polymers therein and curing this product. The polyamides are carboxylic acid amides which contain at least two active hydrogens per molecule which active hydrogens are attached directly to nitrogen. The epoxide polymers include glycidyl polyether products resulting from the reaction of polyhydric phenols with epihalohydrins or polyepoxides so as to give terminal epoxide groups in the polymeric reaction products.

In general, my invention is carried out by intimately mixing (1) a polyvinyl compound, (2) a plasticizer, (3) a polyamide, and (4) an epoxide polymer until a homogeneous mixture is obtained. This homogeneous plastic mass obtained can be used in molding, extruding and calendering operations wherein the cured product possesses decreased thermoplasticity at elevated temperatures.

These polyamides and epoxide polymers can be used to reduce the thermoplasticity of polyvinyl halide copolymers as well as homopolymers. Examples of compounds that can be copolymerized with vinyl halides are (1) vinyl esters of carboxylic acids, such as vinyl acetate, vinyl propionate, vinyl butyrate, (2) alkyl esters of acrylic and methacrylic acid, such as methylacrylate, methylmethacrylate, ethylacrylate, ethylmethacrylate, etc., (3) alkyl esters of haloacrylates, such as methylalphachloroacrylate, etc., (4) vinyl aromatic compounds, such as styrene, (5) vinylidene halides, such as vinylidene chloride, (6) dialkyl esters of maleic and fumaric, such as the diethyl maleate, diethyl fumarate, etc., (7) vinyl alkyl ethers, such as vinyl isobutyl ether, etc.

Polyvinyl halides within the scope of my invention are polyvinyl chloride, polyvinyl bromide, polyvinyl fluoride and polyvinyl iodide, but preferably polyvinyl chloride. Compositions comprising polyvinyl iodide should be avoided where resistance to discoloration at elevated temperatures is important. Where copolymers of polyvinyl halides are employed, the vinyl halide should preferably comprise a major proportion of the total mass, for example, from 50-95% of the total weight of the final polymer. My preferred copolymeric embodiment is the vinyl chloride-vinyl acetate interpolymer.

Plasticizers are generally incorporated into the compositions of my invention. Among the plasticizers that can be used are triaromatic phosphates, such as triphenyl phosphate, tricresyl phosphate, trixylyl phosphate; diesterified carboxylic acids, such as dibutyl sebacate, dibenzyl sebacate, dioctyl sebacate; diesterified aromatic dicarboxylic acids, such as dibutyl phthalate, dioctyl phthalate, etc.

Polycarboxylic amides are useful in making the products of my invention. Although it appears that all hydrogens directly attached to nitrogen are active in reacting with epoxide groups, catalysts such as alkaline and Friedel-Crafts catalysts are often needed in promoting the reaction with some amino- and monoamides. On the other hand, the polyamides of my invention are so reactive with epoxide groups that no catalyst is required. However, a catalyst may be used if desired.

In general, these polyamide compositions should contain at least 2 active hydrogens per molecule which preferable are hydrogens attached directly to the nitrogen of 2 different amido groups. By containing at least 2 active hydogens provided by different amide groups which are separated by at least 1 or more carbon atoms, these polyamides can readily react with a number of epoxide groups with resulting cross-linking to give polyvinyl compounds of decreased thermoplasticity at elevated temperatures. This polyamide cross-linking may be combined with a simultaneous polymerization reaction between epoxide and hydroxyl groups present in the epoxide polymer. As of present knowledge, the chemical and physical relationship of the polyvinl compounds to the amide-epoxide reaction is unknown.

Polyamides can be prepared from dibasic carboxylic acids, such as malonic, succinic, glutanic, adipic, pimelic, azelaic, sebacic, etc., acids dimerized and trimerized unsaturated fatty acids and ammonia, mono- and polyamines provided that the final amide contains at least 1 active hydrogen bound to each nitrogen of the amido structure.

Polyamides can also be prepared from monocarboxylic acids and polyamines having 2 primary amino groups, for example, alkylene diamines, such as ethylene diamine, hexamethylene diamine, etc., and polyalkylene polyamines, such as diethylene triamine, triethylenetetramine, tetraethylene pentamine, etc. Examples of monocarboxylic acids are aliphatic acids, such as acetic, propionic, butyric, stearic, etc.; aromatic acids, such as benzoic; alkyl-ring substituted benzoic acids, such as ethyl benzoic acid, propyl benzoic acid, etc.; resin acids, such as abietic acids, etc.

Amino-amides containing both amine and amide groups can also be used in the instant invention. Sometimes when polyethylene polyamines, such as ethylene diamine, hexamethylenetetramine, etc., are reacted with acids to form amides, these acids react with some but not all of the amino groups so that amino-amides containing both free amine and amide groups result. As will be readily apparent, in such amino polyamides as this, the amine group and the amide group are separated by at least one carbon atom. Therefore, all of the above polyamides may be described as having the amide group attached directly to a carbon atom.

The epoxide polymers used in the instant invention include glycidyl polyethers of a dihydric phenol having a 1,2-epoxy equivalency greater than 1.0 and not more than 2, i. e., having 1–2

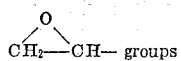 groups in the average molecule of the glycidyl ether. The glycidyl polyethers of dihydric phenols are usually mixtures of polyether polymers and as a result the measured molecular weight upon which epoxy equivalency is determined is the average molecular weight.

For example, the glycidyl compounds of this invention can be prepared by reacting 2,2-bis (4-hydroxyphenyl) propane with epichlorohydrin in alkaline solution with varying ratios of epichlorohydrin per mole to dihydric phenol. By decreasing the mole ratio of epichlorohydrin from 2 to 1, the average molecular weight is increased.

The 1,2 epoxide equivalency of these compounds is determined by heating a weighed sample of the epoxide polymer with an excess of 0.2 N pyridinium chloride chloroform solution at the boiling point under reflux for 2 hours as the pyridinium chloride hydrochlorinates the epoxy groups to chlorohydrin groups. On cooling, the excess pyridinium chloride is back-titrated with 0.1 N NaOH in methanol to the phenolphthalein end point.

Examples of dihydric phenols that can be reacted with chlorohydrin in alkaline solution to yield the glycidyl ethers are mononuclear phenols like resorcinol, catechol, hydroquinone, etc., or polynuclear phenols like 2,2-bis (4-hydroxyphenol) propane, bisphenol, 4,4'-dihydroxybenzophenone, 1,1-bis (4-hydroxyphenyl) ethane, 1,1-bis (4-hydroxyphenyl) isobutane, 2,2-bis (4-hydroxyphenyl) butane, 2,2-bis (4-hydroxy-2-methylphenyl) propane, 2,2-bis (4-hydroxy-2-tertiarybutylphenyl) propane, bis (2-hydroxynaphthyl) methane, 1,5-dihydroxynaphthalene, etc.

Although the epoxide polymer is a complex mixture, it may be represented by the following formula:

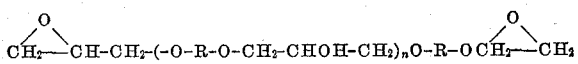

where R is a divalent hydrocarbon radical of a dihydricphenol and $n$ is a whole number. The value of $n$ can be varied by changing the molecular proportions of epichlorohydrin and dihydricphenol.

The preparation of these epoxy compounds is disclosed in U. S. Patents 2,615,007 and 2,615,008 both granted to Greenlee.

In order that those skilled in the art may better understand how the present invention may be practiced, the following examples are given by way of illustration and not by way of limitation. All parts are by weight.

EXAMPLE 1

Polyvinyl chloride powder under the trade name of Geon Number 101 (B. F. Goodrich Company), in the amount of 60 parts and 40 parts of tricresyl phosphate were compounded and milled at 125° C. on differential rollers, such as are used in standard rubber compounding practice. These plasticized sheets which have a rubber-like composition were removed from the rolls. Disks which were ¾ inch in diameter and 0.225 inch thick were cut for thermoplastic flow tests.

EXAMPLE 2

An epoxide polymer (the reaction product of bisphenol A, 2,2-bis (4-hydroxyphenol) propane, and epichlorohydrin) (7.5 parts) and a polyamide resin (a soft, tacky resin derived from the reaction of a mixture of dimerized and trimerized unsaturated vegetable fatty acids with diethylenetriamine) (2.5 parts) were added to 60 parts of polyvinyl chloride powder (Geon Number 101) which had been plasticized with 30 parts of tricresyl phosphate on a rubber mill at 125° C. Milling was continued until a homogeneous composition was obtained in the form of a sheet which was removed from the rollers and cured for 30 minutes at 172° C. Disks which were ¾ inch in diameter and 0.225 inch thick were cut for thermoplastic flow tests.

Thermoplastic flow measurements are obtained in the following manner:

(1) A sample disk to be tested (approximately 0.225 inch thick) was accurately measured.

(2) Aluminum foil of .750 inch diameter was placed on each side of the sample disk.

(3) This was placed in a circulating air oven in which the temperature could be accurately controlled.

(4) The sample was pre-heated for 5 minutes.

(5) A load of 15 pounds per square inch was applied to the samples and readings were taken on a micrometric gauge connected to the sample through the oven at 15, 30, 45, 60, 120, 180, 240, 300, and 360 seconds.

(6) The sample was removed after 6 minutes.

(7) The calculations were made as follows:

$$\frac{O.R.-T.R.}{O.T.}\times 100\% \text{ thermoplastic flow}$$

O. T.—original thickness
O. R.—thickness reading at 0 seconds after pressure applied
T. R.—thickness reading after a specified time interval Decreased plasticity of the cured epoxy-amide-polyvinyl chloride product is demonstrated by the thermoplastic flow comparisons of the products of Example 1 which contains no polyamide-epoxide polymer and Example 2 which contains polyamide-epoxide polymer as shown in the following table:

Table I

| Temp., ° C. | Percent Thermoplastic Flow at 15 pounds per square inch for 6 minutes | |
|---|---|---|
| | Example 1 | Example 2 |
| 125 | 6 | 1.0 |
| 150 | 23 | 1.3 |
| 175 | 31 | 7.0 |

The proportions of polyvinyl compound, plasticizer, polyamide, and epoxide polymer can be varied over wide limits. In practice, the polyvinyl compound should be at least 50% of the final product, the preferable range being 50–70%. All percentages are by weight. Between 10–40%, but preferably 20–30%, of the final product should be plasticizer. In order to preserve the plasticity of the polyvinyl compound, the total amounts of both polyamide and epoxide polymer should not exceed 20%, preferably 5–15%. However, if plasticity of the final composition is not important, larger amounts of polyamide and epoxide compositions may be used.

The ratio of epoxide polymer to polyamide can be varied within wide limits depending on such factors as molecular weights and the number of epoxides and nitrogen-bonded active hydrogens present in the epoxide polymer and polyamide, respectively. The epoxide polymer used may itself be highly polymerized in which case only a small amount of polyamide may be necessary to produce the products of this invention since these highly polymerized epoxides contain fewer epoxide groups per unit weight. With epoxide polymers of a lower degree of polymerization, an increased proportion of amide is necessary.

In comparing equivalent amounts of polyamides and epoxide polymers, each active hydrogen attached to the nitrogen of the amide is considered equivalent to one epoxide group. Thus, the equivalent weight of the amide is the weight of the amide which contains one active amide hydrogen when reacted with the weight of epoxide polymer containing one reactive epoxide group.

The synthetic compositions of this invention are useful as electrical insulation in producing insulated electrical conductors and cables, especially for insulating power transmitting cables operating at higher temperatures and voltages. These compositions can be used in conjunction with other insulation, such as paper, asbestos, varnish combric, rubber, cellulose acetate, etc. They can also be used as an article of manufacture in other applications where elevated temperature thermoplasticity is required. The usual modifying agents generally used for polyvinyl compounds may be employed, for example, fillers, pigments, dyes, opacifiers, mold lubricants etc. Stabilizers, such as compounds of cadmium, barium, lead, iron, strontium, tin, or combinations thereof may also be added to the compositions of this invention.

What I claim as new and desire to secure by Letters Patent of the United States is:

1. A composition of matter consisting of an admixture of (1) 10–40% of a plasticizer, (2) 5–20% of a mixture of a glycidyl polyether of a dihydric phenol and a polyamide having at least two active amido hydrogens per molecule and wherein the amide group is attached directly to another carbon atom, and (3) 50–70% of polyvinyl chloride, the sum of (1), (2), and (3) being equal to 100%.

2. The product produced by heat curing the composition of claim 1.

3. The composition of matter as in claim 1 wherein the plasticizer is tricresyl phosphate.

4. The product produced by heat curing the composition of claim 3.

References Cited in the file of this patent

UNITED STATES PATENTS

| | | |
|---|---|---|
| 2,190,776 | Ellingboe et al. | Feb. 20, 1940 |
| 2,564,194 | De Nie et al. | Aug. 14, 1951 |
| 2,564,195 | De Nie et al. | Aug. 14, 1951 |
| 2,705,223 | Renfrew et al. | Mar. 29, 1955 |
| 2,717,216 | Arone | Sept. 6, 1955 |
| 2,728,737 | Witcoff | Dec. 27, 1955 |
| 2,795,565 | Newey | June 11, 1957 |